US009613518B2

(12) United States Patent
Dunn et al.

(10) Patent No.: US 9,613,518 B2
(45) Date of Patent: Apr. 4, 2017

(54) METHODS AND SYSTEMS FOR MONITORING HAND WASHING

(71) Applicant: InfraRed Integrated Systems Limited, Northampton (GB)

(72) Inventors: Anthony Dunn, Swan Valley (GB); Stuart Holliday, Swan Valley (GB)

(73) Assignee: InfraRed Integrated Systems Limited, Northampton (GB)

( * ) Notice: Subject to any disclaimer, the term of this patent is extended or adjusted under 35 U.S.C. 154(b) by 0 days.

(21) Appl. No.: 14/578,929

(22) Filed: Dec. 22, 2014

(65) Prior Publication Data

US 2015/0194043 A1 Jul. 9, 2015

(30) Foreign Application Priority Data

Jan. 3, 2014 (GB) .................................. 1400092.1

(51) Int. Cl.
*G08B 23/00* (2006.01)
*G08B 21/24* (2006.01)
*G06K 9/00* (2006.01)

(52) U.S. Cl.
CPC ....... *G08B 21/245* (2013.01); *G06K 9/00335* (2013.01); *G06K 9/00771* (2013.01)

(58) Field of Classification Search
CPC .. G08B 21/245; G06F 19/327; G06F 19/3418
USPC ... 340/870.16, 10.1, 573.1, 500, 529, 572.1, 340/539.13, 603, 539.16, 539.11, 539.12, 340/540
See application file for complete search history.

(56) References Cited

U.S. PATENT DOCUMENTS

| 5,793,653 A | * | 8/1998 | Segal | .................... | G07C 1/10 |
| | | | | | 134/57 R |
| 6,236,317 B1 | | 5/2001 | Cohen et al. | | |

(Continued)

FOREIGN PATENT DOCUMENTS

| EP | 0853237 B1 | 1/1997 |
| GB | 2425388 A | 10/2006 |

(Continued)

OTHER PUBLICATIONS

Extended European Search Report for Application No. 15150008.9, Jun. 22, 2015, 5 pages.

(Continued)

*Primary Examiner* — Hoi Lau
(74) *Attorney, Agent, or Firm* — Fredrikson & Byron, P.A.

(57) ABSTRACT

Using a processor to receive a signal indicative of actuation of a cleansing product dispenser at a hand cleansing station and to receive a signal indicative of the presence of an individual at said cleansing station following actuation of the cleansing product dispenser. The processor is configured to process said signals to generate hand wash event data indicative of a length of a continuous period of time spent by said individual at said hand cleansing station. Hand wash event data is collated for a plurality of hand wash events at a stand-alone hand cleansing station or a plurality of linked hand cleansing stations in order to provide an indication of hand wash quality for said plurality of hand wash events and/or an indication of a number of compliant hand wash events. A running total of compliant hand wash events may be displayed to users.

17 Claims, 6 Drawing Sheets

(56) References Cited

U.S. PATENT DOCUMENTS

| | | | |
|---|---|---|---|
| 6,404,837 B1* | 6/2002 | Thompson | A47K 5/1208 377/13 |
| 6,727,818 B1* | 4/2004 | Wildman | G06F 19/3418 340/10.1 |
| 7,375,640 B1* | 5/2008 | Plost | A47K 5/1217 340/500 |
| 8,344,893 B1* | 1/2013 | Drammeh | G08B 21/245 340/540 |
| 8,525,666 B2* | 9/2013 | Melker | 340/528 |
| 8,823,551 B1* | 9/2014 | Hoffman | B60L 11/182 340/932.2 |
| 9,000,926 B2* | 4/2015 | Hollock | G08B 21/245 340/573.1 |
| 2004/0001009 A1* | 1/2004 | Winings | G08B 21/245 340/870.16 |
| 2005/0248461 A1* | 11/2005 | Lane | G08B 21/245 340/573.1 |
| 2007/0257803 A1* | 11/2007 | Munro | G08B 21/245 340/573.1 |
| 2008/0001763 A1* | 1/2008 | Raja | A61L 2/18 340/573.1 |
| 2008/0087719 A1* | 4/2008 | Sahud | G08B 21/245 235/376 |
| 2008/0221396 A1* | 9/2008 | Garces | A61M 1/0286 600/300 |
| 2008/0246599 A1* | 10/2008 | Hufton | G01S 1/70 340/529 |
| 2008/0306705 A1* | 12/2008 | Luo | B61K 9/04 702/134 |
| 2009/0087028 A1 | 4/2009 | Lacey et al. | |
| 2009/0091458 A1* | 4/2009 | Deutsch | G06F 19/327 340/573.1 |
| 2009/0112541 A1* | 4/2009 | Anderson | G09B 19/0076 703/11 |
| 2009/0146813 A1* | 6/2009 | Nuno | G08B 21/22 340/572.1 |
| 2009/0195385 A1* | 8/2009 | Huang | G08B 21/245 340/572.1 |
| 2009/0224924 A1* | 9/2009 | Thorp | G08B 21/245 340/573.1 |
| 2010/0117823 A1* | 5/2010 | Wholtjen | G06F 19/327 340/539.13 |
| 2010/0117836 A1* | 5/2010 | Seyed Momen | G01S 1/70 340/573.1 |
| 2010/0134296 A1* | 6/2010 | Hwang | A47K 5/1217 340/573.1 |
| 2010/0164728 A1* | 7/2010 | Plost | G08B 21/245 340/573.1 |
| 2010/0315244 A1* | 12/2010 | Tokhtuev | G06Q 10/00 340/603 |
| 2010/0332022 A1 | 12/2010 | Wegelin et al. | |
| 2011/0057799 A1* | 3/2011 | Taneff | G06F 19/327 340/573.1 |
| 2011/0063106 A1* | 3/2011 | Snodgrass | G06F 19/327 340/539.16 |
| 2011/0121974 A1* | 5/2011 | Tenarvitz | G08B 21/245 340/573.1 |
| 2011/0193703 A1* | 8/2011 | Payton | G08B 21/245 340/573.1 |
| 2011/0291841 A1* | 12/2011 | Hollock | G08B 21/245 340/573.1 |
| 2012/0062382 A1* | 3/2012 | Taneff | G08B 21/245 340/573.1 |
| 2012/0194338 A1* | 8/2012 | Snodgrass | G08B 21/245 340/539.12 |
| 2012/0256742 A1* | 10/2012 | Snodgrass | G06F 19/327 340/539.12 |
| 2013/0027199 A1* | 1/2013 | Bonner | G08B 21/24 340/539.11 |
| 2013/0113619 A1* | 5/2013 | Snodgrass | G07C 11/00 340/539.11 |
| 2013/0122807 A1* | 5/2013 | Tenarvitz | H04B 5/0031 455/41.1 |
| 2013/0127615 A1* | 5/2013 | Snodgrass | G05B 1/01 340/539.13 |
| 2013/0229276 A1* | 9/2013 | Hunter | G08B 21/245 340/501 |
| 2013/0332184 A1* | 12/2013 | Burnham | G06Q 10/0635 705/2 |
| 2013/0342349 A1* | 12/2013 | Cruz | G08B 21/245 340/573.1 |
| 2014/0070950 A1* | 3/2014 | Snodgrass | G06F 19/327 340/573.5 |
| 2014/0259382 A1* | 9/2014 | Dobizl | E03C 1/046 4/677 |
| 2014/0375458 A1* | 12/2014 | Miller | G08B 21/245 340/573.1 |
| 2015/0294597 A1* | 10/2015 | Rizzo | A61H 3/04 340/4.12 |

FOREIGN PATENT DOCUMENTS

| | | |
|---|---|---|
| WO | 2013/190016 A1 | 12/2013 |
| WO | 2014/082151 A1 | 5/2014 |

OTHER PUBLICATIONS

Search Report Under Section 17 for Application No. GB1400092.1, Jun. 30, 2014, 1 page.

Irisys Thermal Technology for Intelligent Buildings, Cutting Rates of Hospital Acquired Infections (HAI), Jun. 20, 2014, 1 page.

\* cited by examiner

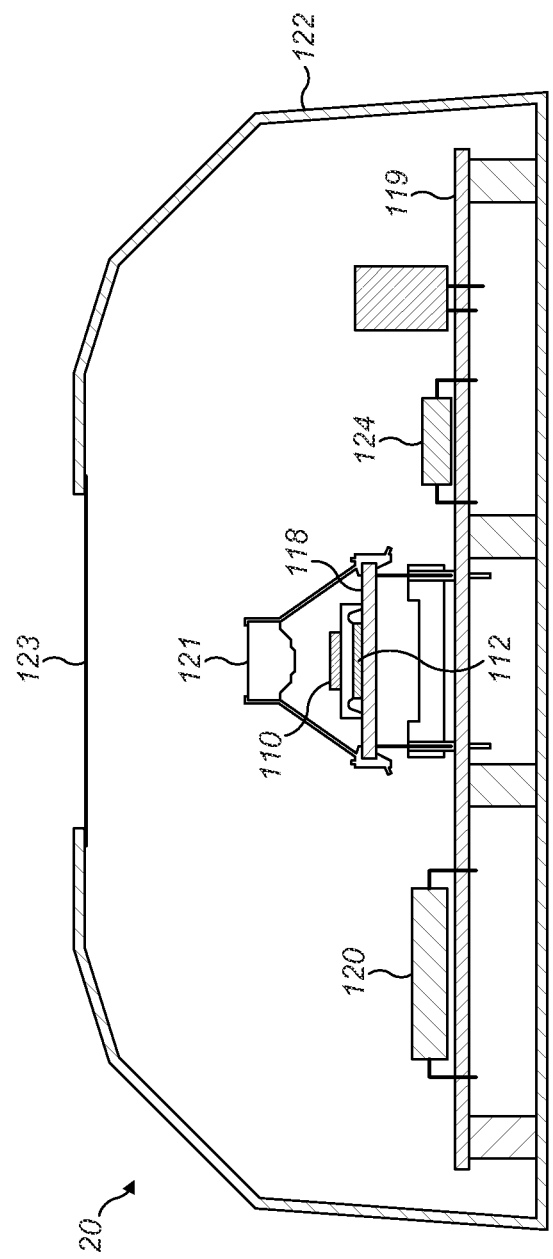

METHODS AND SYSTEMS FOR MONITORING HAND WASHING

CROSS REFERENCES

This application claims the benefit of Great Britain Application No. GB1400092.1, filed Jan. 3, 2014, the content of which is hereby incorporated by reference in its entirety.

FIELD OF THE INVENTION

Certain embodiments of the invention relate generally to methods or systems for monitoring hand washing by individuals. Certain embodiments relate more particularly, but not exclusively, to monitoring hand washing by individuals engaged in food preparation.

BACKGROUND

There are numerous situations where hand washing or cleansing is particularly important, such as in hospitals, food preparation areas and public toilets. Statistics show that people in general do not wash their hands as often as needed or to the degree needed for effective infection control. Therefore it would be useful to be able to monitor the observance of hand washing requirements.

The preparation, handling and cooking of food in establishments such as restaurants requires very high levels of hygiene and cleanliness. Contamination of food is recognized to happen primarily through contact with workers hands, other food stuffs and/or surfaces that are contaminated. Contamination can lead to infection of diners including serious illness with life changing consequences and even death in the most serious of outbreaks. Furthermore, the reputational damage to a business of an outbreak of illness caused by contaminated food may be so considerable as to result in closure of the business. In any event, significant litigation and compensation costs may fall on insurers causing insurance premiums to rise significantly.

The food preparation environment is often pressured, busy and cramped with staff members varying greatly in experience and competence. In addition, many restaurant workers are young, low paid and inexperienced with these factors being further exacerbated by high rates of turnover of staff and the use of casual workers.

Staff working in kitchens for food preparation and cooking are, in many countries, required to comply with legal regulations on food handling and hygiene including hand washing. For example, such regulations are issued by the Food and Drug Administration (FDA) department in the USA and the Foods Standards Agency (FSA) in the UK. In many cases, such regulations require the provision of sinks or wash basins dedicated only to hand washing for which soap is mandated in order to achieve an acceptable quality of hand washing followed by drying with single-use paper towels. Hand sanitizers are not efficacious for many contaminants that may be transferred by hands to food and so are often not sanctioned in food preparation environments.

It is generally accepted in the food preparation industry worldwide that hand washing performance by relevant staff is much too low, but businesses find it very difficult to measure it effectively and economically, to increase its occurrence among staff, and to verify changes and then sustain them. A significant challenge is to measure hand washing frequency and the quality of the washing process. This is difficult by manual direct observation due to the complex environments in which observation is required and impractical to do continuously. At present, the risk is often managed largely through insurance in case an infection is caused, but this of course does little or nothing to mitigate the risk to a business's reputation from an outbreak caused by contamination of customers' food. If a restaurant could demonstrate acceptable hand wash compliance to certain sustainable standards, insurance companies might offer a discount on premiums in recognition of the reduced risk of food illness outbreaks resulting from improved, sustained hand hygiene practices.

In other environments, such as hospitals at the point of care delivery, there are areas that are considered clean such as the zone around a patient where portal sensors may be used to determine when healthcare workers enter and leave the "patient zone." This is however not analogous to food preparation environments where staff involved in food preparation may remain at a location for long periods without coming and going over a positional threshold. Similarly, in the same area other workers including managers and servers such as waiting staff may pass through without having the same requirements to wash their hands.

Methods of monitoring and attempting to improve frequency of hand hygiene used in the past include:

1. Manual surveys and audits combined with feedback and/or training. Direct observation by human auditors has been shown to give rise to the "Hawthorn effect" where performance is improved above normal levels because staff know that they are being observed. Training can improve performance temporarily but this is typically not sustained without continued intervention. Remedial training and prompting may typically be required frequently especially where there are high levels of staff turn-over and low paid or young workers are involved who are poorly motivated.

2. Monitoring every interaction of an individual with soap dispensers or sinks has been tried however this requires technology of the type such as RFID tags on employees which have been found to be problematic in that they cause resentment and are not liked. Additionally, they incur a management overhead especially if staff turn-over is frequent and significant. A further disadvantage of tags is that they may be forgotten, lost, accidentally damaged or sabotaged rendering the system unable to properly monitor individuals. Further, wireless tags on employees typically must interact with a sensor at the sink, usually on the soap dispenser or tap/faucet. Installing a tap sensor typically involves introduction of an electronic sensor to the plumbing and is not preferred. Finally, even if reliable, where the only indication of a wash is that the soap dispenser was operated, a disadvantage is that it may be carried out without washing to give a false view of a worker's hand hygiene performance and easily render the data non-representative.

As demonstrated in many industries, in order to improve a process or performance it is often preferrable to identify a meaningful metric that is indicative of performance and to have a reliable and accurate means to measure it. There is no universally accepted and monitored metric identified for the food industry with respect to hand washing. However a useful metric is the number of hand washes per relevant employee per period of time. The technical challenge therefore is to measure this accurately starting with measurement of hand washes meeting an acceptable standard.

Automatically measuring the quality of a hand wash is technically complex and normally cannot be satisfactorily achieved by an automatic system. Instead, it typically requires a trained human observer who must visually, e.g., manually, determine the extent to which all the steps of the recommended procedure are carried out, such as the World Heath Organisation's recommended hand washing procedure.

US2009/0087028A attempts to address this problem. It discloses that the recommended time for hand washing is a minimum of 15 seconds of hand rubbing and that studies have shown that both long (3 mins) and short (10 seconds) wash cycles can produce a ten fold reduction in the median number of transient bacteria thereby suggesting that hand washing technique is much more important than duration. Consequently, US2009/0087028A proposes an automatic hand washing monitoring system comprising a camera and a processor, the processor being adapted to receive from the camera images of hand washing activity. The processor analyzes mutual motion of hands to determine if the hands mutually move in desired poses, and if so, the durations of the patterns; and, in response, generates a hand washing quality indication according to the analysis. This is a computationally very intensive and difficult monitoring process to implement requiring a high resolution camera. Furthermore, as a very exacting hand washing technique is required to achieve a hand wash of sufficient quality to be considered a pass, this monitoring system necessitates a significant amount of staff training. Also, depending on its implementation, this monitoring system can lead to excessively long hand washes which staff may not like and are therefore not motivated to implement on a sustained basis.

SUMMARY

Certain embodiments of the invention provide a robust method and system of monitoring hand washing that uses a signal or data indicative that a cleansing product dispenser has been used to initiate the substantive washing monitoring process.

Certain embodiments of the invention provide a computationally simpler method and system of automatically monitoring hand washing than found in known systems at a low cost, which is autonomous, which may be self-contained and where the monitoring does not require any change to the workflow of employees.

Automatically monitoring hand washing events by individuals to achieve meaningful results is technically complex. Generally, certain embodiments of the invention comprise using a processor to receive a signal indicative of actuation of a cleansing product dispenser at a hand cleansing station and to receive a signal indicative of the presence of an individual at said cleansing station following actuation of the cleansing product dispenser. The processor is configured to process said signals to generate hand wash event data indicative of a length of a continuous period of time spent by said individual at said hand cleansing station. Hand wash event data is collated for a plurality of hand wash events at a stand-alone hand cleansing station or a plurality of linked hand cleansing stations over a predetermined time period in order to provide an indication of hand wash quality for said plurality of hand wash events and/or an indication of a number of compliant hand wash events where a compliant hand wash event is determined by reference to one or more thresholds. A running total of all washes and/or compliant hand wash events, or proportion thereof, may be displayed to users or otherwise analyzed for management or other purposes.

In a first main aspect of the invention, there is provided a method of monitoring hand washing by individuals, comprising the steps of: receiving at a processor a signal indicative of actuation of a cleansing product dispenser at a hand cleansing station; receiving at said processor a signal indicative of the presence of an individual at said cleansing station following actuation of the cleansing product dispenser; and processing said signals to generate hand wash event data indicative of a length of a continuous period of time spent by said individual at said hand cleansing station.

The method may include processing said hand wash event data to provide an indication of hand wash quality for said hand wash event.

Preferably, the method further comprises collating hand wash event data for a plurality of hand wash events and processing said data to provide: an indication of hand wash quality for said plurality of hand wash events; and/or an indication of a number of compliant hand wash events where a compliant hand wash event being determined by reference to one or more thresholds. A preferred first threshold is a minimum length of time an individual should remain at the hand cleansing station in order for an associated hand wash activity to be judged as comprising a compliant hand wash event. However, additionally or alternatively, other thresholds or parameters may be employed. One such parameter is subsequent actuation of a hand towel dispenser apparatus or hand dryer apparatus by the individual, although for food preparation environments, it is preferred that hand towel dispensers are utilized.

In at least one embodiment, the processor may be configured to collate hand wash event data for a plurality of hand wash events and to perform statistical analysis of collated hand wash event data to determine at least one of: a mean hand wash time comprising a mean time spent by an individual at a hand cleansing station following actuation of a hand cleansing product dispenser; a distribution of hand wash times; and a distribution of mean hand wash times. An increase in hand wash quality indication may then be determined from any one or any combination of: an increase in a length of mean hand wash time; a narrowing of the distribution of hand wash time; and a narrowing of the distribution of mean hand wash times.

Preferably, hand wash event data is collated for a plurality of hand wash events at a plurality of hand cleansing stations and such data may be collected over a predetermined time period such as a set time period; an arbitrary time period inputted to the processor; or a time period determined from staff presence data.

In at least one embodiment, staff presence data is obtained from a staff roster and/or from apparatus used by staff to clock on and off. Consequently, a collated set of data may be associated with an identifiable group of staff and therefore any statistics on, for example, quality of hand washing and/or numbers of hand wash events deemed compliant derived from said set of data will represent the hand washing performance of that identified group of staff.

An increase in hand wash quality indication for a hand cleansing station or a group of hand cleansing stations may be determined from any one or any combination of: an increase in a length of mean hand wash time; a narrowing of the distribution of hand wash time; and a narrowing of the distribution of mean hand wash times. As already indicated, these measures of hand washing quality/compliance may be directly associated with an identifiable group of staff for management purposes.

In order to provide feedback to staff, the method preferably comprises the step of displaying on a display any one or any combination of: a running total of all hand wash events; an indication of hand wash quality; a running total of compliant hand wash events.

The method of the invention also preferably includes the step of providing an audible and/or visual countdown indication to an individual at a hand cleansing station until their hand wash achieves compliant status or an audible and/or visual indication that their hand wash is considered to be a compliant hand wash event.

In certain embodiments, signals or data indicative of a continuous period of time spent by an individual at said cleansing station following actuation of the cleansing product dispenser is generated by a detector associated with the hand cleansing station and/or the cleansing product dispenser. While the detector may comprise a PIR detector associated with the hand cleansing station and/or the cleansing product dispenser, in preferred embodiments the detector comprises a sensor having an array of thermal detector elements. The sensor is preferably also a low resolution sensor. The signals or data provided by the detector may be provided in response to actuation of the cleansing product dispenser, but in some embodiments the detector provides signals or data to the processor even before actuation of the cleansing product dispenser. The detector may be a part of a detector system that tracks individuals in both space and time within a coverage area of the detector system.

In some embodiments, signals or data indicative of a continuous period of time spent by an individual at said cleansing station following actuation of the cleansing product dispenser may be additionally or alternatively derived from the signal or data indicating actuation of the cleansing product dispenser and from the signal or data indicating actuation of a hand towel dispensing or hand drying apparatus.

In some embodiments, the detector or detector system may be arranged to determine the presence of an individual at said hand cleansing station where said individual is detected within a predetermined space in the vicinity of said hand cleansing station.

In some embodiments, the one or more hand cleansing stations comprise wash sinks and the one or more cleansing product dispensers comprise soap dispensers.

In a second main aspect of the invention, there is provided a detector for monitoring hand washing by individuals at a hand cleansing station, the detector comprising: a means to receive a signal indicative of actuation of a cleansing product dispenser; one or more sensors configured to determine the presence of an individual at said hand cleansing station and to output a signal indicative of the presence of the individual at said hand cleansing station; and a processor adapted to process said signals to generate hand wash event data indicative of a length of a continuous period of time spent by said individual at said hand cleansing station after actuation of the cleansing product dispenser.

In some embodiments, the detector may be part of a stand-alone hand cleansing station or it may be part of a series of linked detectors comprising a detector system associated with a plurality of hand cleansing stations.

In a third main aspect of the invention, there is provided a hand cleansing station for monitoring hand washing by individuals, the hand cleansing station having a detector according to the second main aspect of the invention.

In a fourth main aspect of the invention, there is provided a system for monitoring hand washing by individuals, said system comprising: one or more hand cleansing stations according to the third main aspect of the invention; a central station comprising a main processor and a memory; a network communicatively connecting each of said one or more hand cleansing stations to the central station, said central station being adapted to receive signals or data from the one or more hand cleansing stations. A master detector unit of the detector system may comprise the central station.

In a fifth main aspect of the invention, there is provided a computer readable medium comprising machine readable instructions which when executed by a processor cause the detector of the second main aspect of the invention, the hand cleansing station of the third main aspect of the invention or the system of the fourth main aspect of the invention to perform the steps of the method of the first main aspect of the invention. The computer readable medium may comprise a non-transitory computer readable medium.

The details of one or more examples are set forth in the accompanying drawings and the description below. Other features, objects, and advantages will be apparent from the description and drawings, and from the claims.

BRIEF DESCRIPTION OF THE DRAWINGS

The foregoing and further features of certain embodiments of the present invention will be apparent from the following description of preferred embodiments which are provided by way of example only in connection with the accompanying figures, of which:

FIG. 7 is a schematic block diagram of a presence detector according to the invention.

Figure 1:
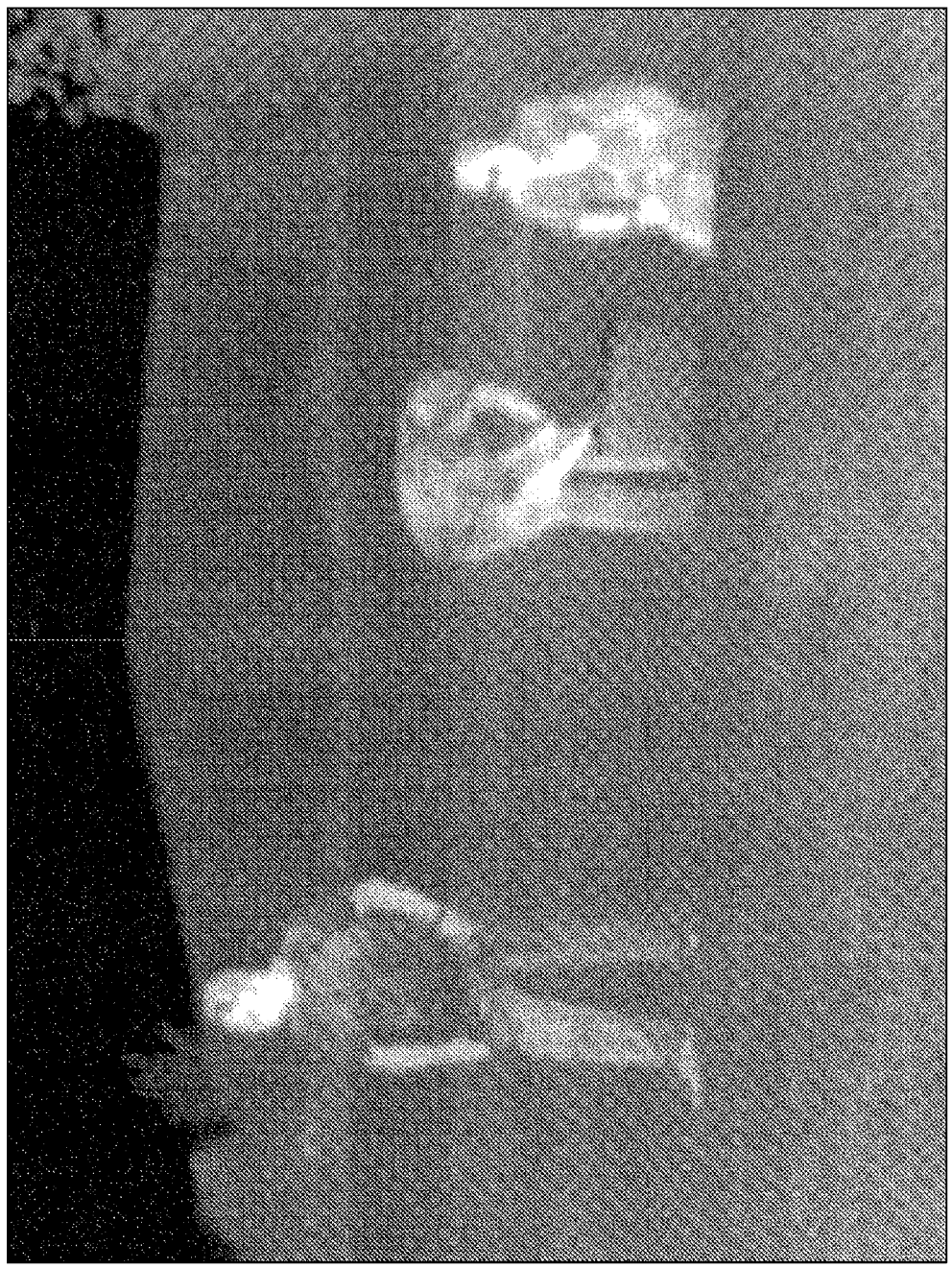
FIG. 1 shows, for the purpose of comparison, a comparatively high resolution image from a high resolution thermal imaging camera.

DESCRIPTION OF PREFERRED
EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It is noted that even diligent and motivated employees may tend to short-cut procedures when under pressure with the best of intensions, e.g. to complete more work quickly. Introducing new tasks only makes the problem worse. It is preferable therefore to devise a system that fits in with the workflow of the employee and such that it should not be easily circumvented. It is a further advantage if the system can provide immediate feedback to assist the employee to know that they and possibly also their colleagues are doing what is required of them.

Certain embodiments of the invention help meets these parameters by providing a method and system of automatically monitoring hand washing by individuals in a manner which encourages compliance with an acceptable standard of hand washing and preferably provides a display of at least a running total of hand wash compliant events. The running total may be time dependent in that it relates to the total within a last specified period of time.

It should be noted that "washing" is not limited to the use of water and encompasses the application of water or some other liquid for the purpose of cleansing. Thus "washing" generally includes but is not limited to the use of sanitizing wipes, conventional washing with soap and water and the application of other cleansing liquids such as gel rubs. That being said, in some embodiments of the invention as defined by the appended claims, the term "washing" is to be taken as concerning washing with water and a soap product. Such embodiments are particularly relevant to the food preparation industry.

While in the following description of exemplary embodiments, the embodiments refer to washing with soap and water, one skilled in the art will recognize that the methodologies taught by said description of exemplary embodiments can be applied to other arrangements for cleansing hands not requiring water and/or soap.

Since washing hands with soap and water can only be accomplished while present at a sink or wash-station, and hand-washing is mandated for food preparation by national legal requirements in many countries to take place at dedicated sinks or wash stations, it is recognized by certain embodiments of the present invention that combining automatic observation of persons individually remaining present at a sink/wash station for a predetermined minimum period of time after soap is dispensed at said wash station provides a reliable and robust measurement of rates of acceptable, e.g. compliant, hand washes (hand wash events).

One generally accepted hand washing process involves the following steps:
  1. Wet hands with water whist rubbing to remove larger contaminants;
  2. Apply soap;
  3. Rub hands all over as prescribed by the WHO process;
  4. Rinse hands under running water; and
  5. Dry hands on clean towels and discard the towels.

Steps 2 to 4 may take up to 30 seconds to complete and must be performed at the sink or wash station as must step 1 if included. Step 5 may further extend the time at the sink although the towels may be separated a little from the sink and staff can dry hands while moving away towards waste bins before discarding the towels. Consequently, steps 2 to 4 are considered as comprising the substantive part of the hand washing process in keeping with certain embodiments of the present invention, although, in some embodiments, the dispensing of a towel or the use of a warm air hand dryer apparatus may form a substantive part of the hand washing process. That being said, while air dryers may also be used, they are not recommended, or preferred, as they take longer to dry hands than towels causing delay and making it less likely that the hands will be fully dried which is a risk for propagation of pathogens. In some known hand washing processes such as that discussed in US2009/0087028A, step 1 may be omitted.

It is apparent that the duration of the hand wash process provides a real and meaningful indication of a thorough and quality hand wash. Measuring the duration a person remains present at the sink after dispensing soap is therefore a very good indication of quality especially in a programme of continuous review supplemented with training. Requiring the presence of staff at the sink for a minimum threshold duration after dispensation of soap increases confidence that a compliant wash has indeed taken place. Being able to measure this provides a more robust indication of a good quality hand wash having occurred than any other state of the art methods apart from direct observation by a human or a burdensome system as taught by US2009/0087028A. While an ill-disposed or mischievous employee with an understanding of the methodology could dispense soap onto the sink or floor and then stand at the sink without washing for the required period it is anticipated than most people will take the view that they may as well use the time to wash their hands and, if they do not do so, the unproductive loitering in the location for the required threshold time would be easily observed by a supervisor or manager or even automatically monitored by the system of the invention through issuance of an indicator of a non-compliant wash event. In any event, certain embodiments of the present invention is adapted to detect such loitering.

Certain embodiments of the present invention therefore combine the detection of soap dispensation by an individual at a suitably provisioned soap dispenser with measurement of duration of continuous presence in the required hand cleansing station location to give an indication of the wash quality and/or in order to determine if a compliant wash has taken place by application of a threshold minimum time.

A system may comprise one or a plurality of sinks/wash stations which may be reported on collectively allowing staff to use one of several suitable locations to wash their hands and allowing meaningful feedback to be provided to the staff as a whole.

In addition to measuring compliant wash events, the system may include a display which shows the number of valid hand wash events over a period of time, for example the previous hour on a rolling basis. The system may also provide real time or delayed updates (e.g. by 5-15 minutes) of current performance for reference by managers or supervisors.

Dependent on location of the display the effectiveness may be further enhanced as a demonstration of performance to other staff (and diners in a restaurant setting) if visible to peers or other relevant stakeholders.

Real time or near-real time data is advantageous in this application as the priority is to support high standards in hand hygiene immediately in order to reduce risk rather than to report poor compliance at a later time, although reporting on compliance falls within the scope of the invention.

Any automatic sensing system will have some level of inaccuracy but this should be sufficiently low so as not to give rise to a loss of confidence therefore aggregating the data over a period such as one hour and delaying updates for a period of 15 minutes, for example, will allow accuracy without the risk of an erroneous judgment on a single event being apparent and give undue significance.

In addition, the system may be programmed with the number of staff working throughout the week at different times and a target set for each period based on a requirement of a number of hand washes per employee per period e.g. 5 hand washes per employee hour. If four staff were working on preparing food, the target for the team for one hour might be 20 hand washes. The data for the number of staff on duty may be entered manually for example via a web interface to the system or read directly over a network (LAN/WAN/ mobile) from a database, staff scheduling system, or time and attendance system such as a time-clocking in/out system. Alternatively, a target for a number of hand washes per hour may be computed or adjusted to be more accurate using a metric provided to the system that indicates how busy the restaurant is, e.g. the number of people counted through the entrance, the number of "covers" (place settings) served by the restaurant per period which is especially suited to electronic order taking, or the number of transactions at the point of sale. While there may be some disassociation in time between some of these measures and the time at which each meal is prepared the data may alternatively be used at the end of the day to make corrections or to predict future demand.

The data may be collated by a remote data system in order to produce reports. The system may further be enhanced by an indicator placed so as to be apparent by the person using the sink which indicates either that a compliant wash duration is complete/is not yet complete or will be complete in the indicated time.

The foregoing features of the invention will be described in more detail below.

The invention comprises one or more sensors such as a presence detector for determining presence of a person at a sink or hand wash station. In the preferred embodiments, use is made of a low resolution thermal array sensor.

It is preferred that any detector device having a sensor used to monitor the movements of the subject should provide very low resolution by comparison to known CCTV cameras. The number of detector elements in each sensor is preferably no more than 10,000. In some possible embodiments the number of elements is no more than 2000.

On the other hand there are preferably sufficient elements to be able to track movement rather than simply detect the presence or absence of an individual, as is possible with a simple PIR detector, although some embodiments may employ simple detection using PIR detectors. Tracking movement can be achieved with as few as 50 elements. Thus a preferred minimum number of detector elements is 50. A higher number such as 200 is preferred for some applications. Since the array will usually but not necessarily be square, in one embodiment the array preferably comprises at least 16×16 detector elements.

Closed circuit television cameras (CCTV) have been used in video surveillance but are often deemed unacceptable because of intrusiveness. In other words, they provide such detailed information that they are not thought to be acceptable to persons whose behavior might need to be monitored. Possibly "fuzziness" could be created to degrade a sharper image in a CCTV image. However, it is now known that such "artificial" blurring of an original clear image is capable in certain circumstances of being reversed by sophisticated digital means. Therefore for reasons of privacy for the individual it is preferred that the source of the data to be processed is very low in resolution. Thus information is not stored in the first place and could not therefore be digitally extracted later. Thermal sensors are ideal for this purpose and have other advantages.

A suitable thermal sensor is made up of a two dimensional array of infrared sensitive detector elements, preferably pyroelectric detector elements with the number of elements in the array typically between 16×16 and 48×48, together with an optical lens which focuses an image of the scene onto the detector element array. The sensor has readout means for monitoring signals from the detector elements and means for interpreting such signals to determine the presence of selected targets and tracking their motion in time and space. The sensor has analysis means to further characterize this information as used for the invention described elsewhere. The preferred sensor is not chopped or shuttered to provide a comparison between a blank scene and the active scene to facilitate image difference processing (described elsewhere) but such a facility might be included in certain circumstances to assist in identification of, for example, stationary objects. A suitable detector sensor is described in EP-A-0853237.

Thus in one embodiment of any of the methods according to the invention, the sensors use image difference processing to determine the position of objects in the space.

The preferred thermal sensors comprise arrays of thermal detector elements, e.g. pyroelectric detector elements, which produce images that are blurred (fuzzy) in space. This is due in part to the low resolution of the arrays and to the use of low-cost optics which have limited acuity, but also to the fact that each detector element shows only changes in the images. In addition, due to the nature of the material that receives the infra-red signal, the thermal signal 'bleeds' or diffuses laterally through the material of the infrared detector array, so adding to the blurring. In this way, the anonymity and privacy of the individual are maintained.

As will be described in more detail below, using the preferred detector sensor, the nature of the thermal image obtained from a person moving around in the field of view of a detector is such that there is no possibility of obtaining detail regarding what an individual looks like or is doing except in the most basic way.

Another advantage of thermal imagers over CCTV is that thermal detectors are able to work under varying light conditions including conditions that would make the use of CCTV extremely difficult. Working in the infra-red allows this system and methods to work easily under any indoor lighting conditions, including complete darkness.

Another advantage is that a pyroelectric detector sees only changes in the scene, so background clutter 'disappears', allowing the system to focus on the subjects of interest. This coupled with the fact that a low resolution sensor is preferred leads to a great saving in terms of data to be processed.

As noted above, it is preferred not to use high resolution imaging sensors. The reason for this will firstly be explained in more detail with reference to FIGS. 1 to 4.

High quality thermal imagers produce movie-like images which will record the thermal scene in detail and in particular will "see" stationary targets in the field of view as well as moving objects. This, combined with a high resolution (pixels per unit field of view), makes facial identification possible and could display detailed behavior (scratching, nose picking, etc). An example image from a high resolution thermal imager is shown in FIG. 1. The sensor used to produce this image would typically have over 76000 detector elements.

The system and methods of the invention preferably use low element count thermal detector arrays which show insufficient detail to be intrusive. The arrays could use pyroelectric detectors or resistive bolometers, for example.

Pyroelectric detectors produce a signal or image only when the incident infrared radiation is modulated, either by movement of the target or by means of a mechanical chopper. If a pyroelectric array "stares" through a suitable lens at a stationary scene, no image will be produced. In order to produce an image a mechanical chopper may be used with image difference processing to subtract the chopper-closed signal from the chopper-open signal.

Figure 2:
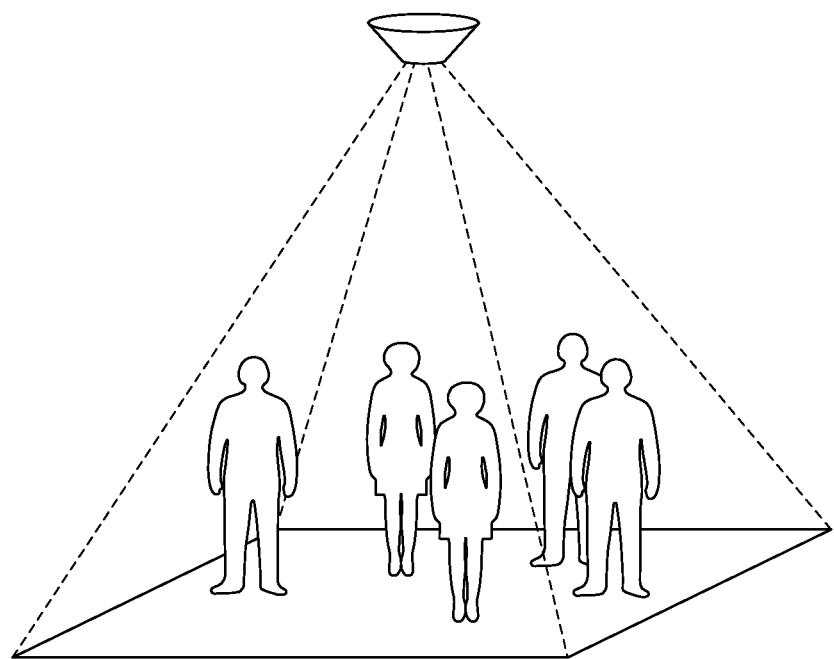
FIG. 2 is a schematic diagram showing a ceiling mounted detector having a sensor comprising an array of thermal detector elements with its associated field of view.

The system and methods of the invention can be implemented using low element count pyroelectric arrays without a chopper or image difference processing. As noted above pyroelectric detectors only respond to changes in the input radiation, so a moving target becomes a "blurred blob" in an otherwise uniform image. This "blob" can be tracked and identified as a target but only gross actions (walking, stopping, rapid speed changes etc) of the target can normally be seen. If the target remains motionless it disappears from the image altogether and it is by using a tracking algorithm that knowledge of the target's location can be retained and it can be picked up again when it moves. However, in some embodiments of the invention, the detector may be selected as one having a number of detector elements towards the top end of the range hereinbefore described such that the detector can identify the signature of small movements characteristic of an individual washing their hands, e.g. the movement of the individual's hands. In such embodiments, the higher number of detector elements is selected as still preserving the identity of the individual. FIG. 2 shows a ceiling-mounted 16×16 sensor viewing five people moving through the field of view, and FIG. 3 shows an un-chopped image obtained from the sensor to illustrate how little resolution is needed in order to implement the methods and system of the invention.

Notwithstanding the foregoing, for some applications it may be desirable to incorporate some image difference processing in order to collect limited additional information about fixed objects such work stations, tables or other furniture. By chopping the image on a pyroelectric detector it is possible to artificially create a time dependent signal and so stationary heat sources (targets) show up on the image. Even with such image difference processing low spatial resolution of sensors still ensures that the system is not undesirably intrusive.

Figure 3:
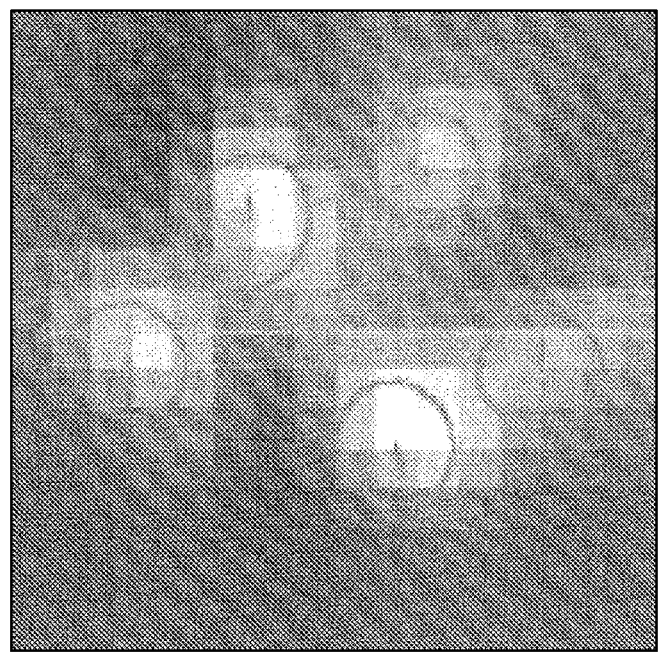
FIG. 3 shows a typical "un-chopped" image produced by a 16×16 array in the arrangement of FIG. 1.
Figure 4:
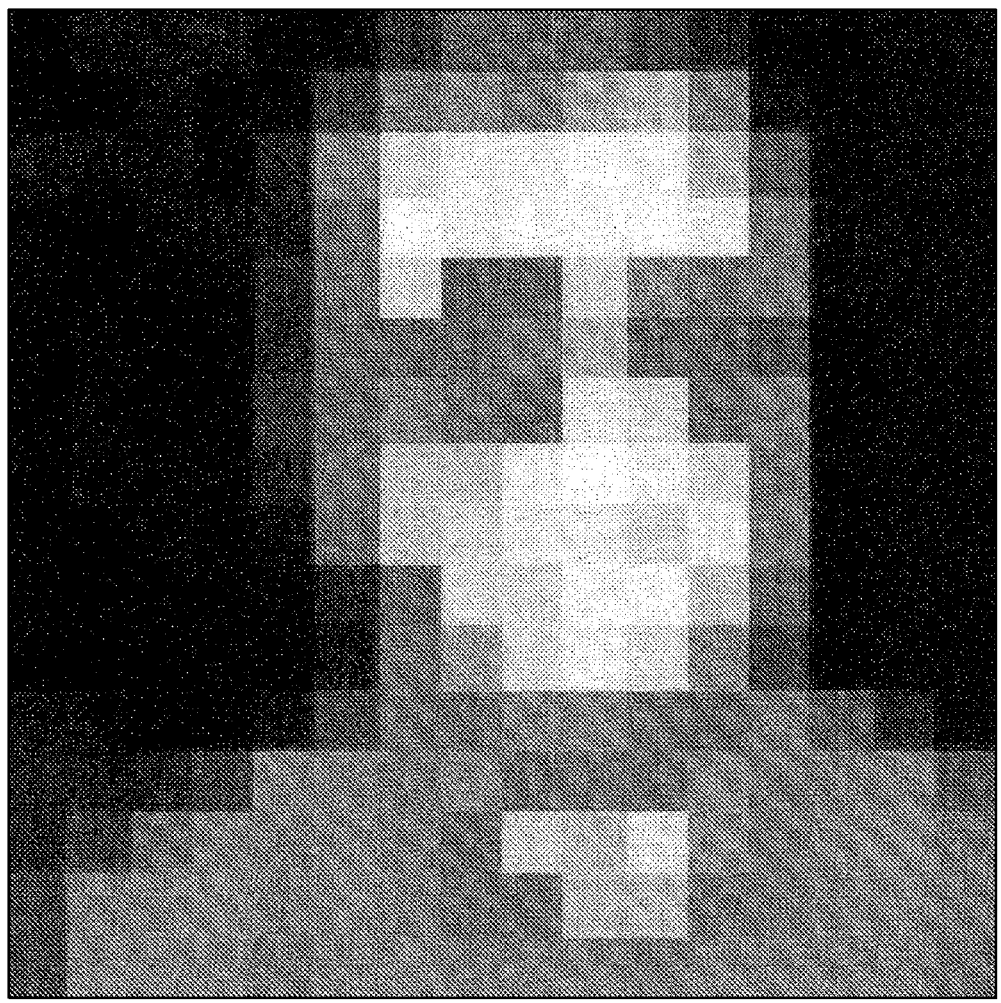
FIG. 4 shows a "chopped" image of a face using a 16×16 thermal imager with image difference processing.

It is clear from FIG. 3 that only 16×16 elements lead to an extremely coarse picture. By comparison the "minimum" spatial resolution for a thermal imager of sufficient quality to "see" objects reasonably clearly is 160×120 and can be 384×288 or better as shown in FIG. 1. Chopped imagers with 16×16 elements still show targets as animated "blobs" as can be inferred from the chopped image shown in FIG. 4. Of course the actual level of detail available from a sensor depends on its field of view and distance between the sensor and the target. Typically imagers have a 20 degree field of view but can have as narrow as 10 degree or as wide as 35 degree or more. The wider the angle the greater the area of scene transferred to the imaging plane and for objects at a similar distance the detail will be lower. However for a wide field of view a target could stand much closer to the sensor to be seen more clearly.

Figure 5:
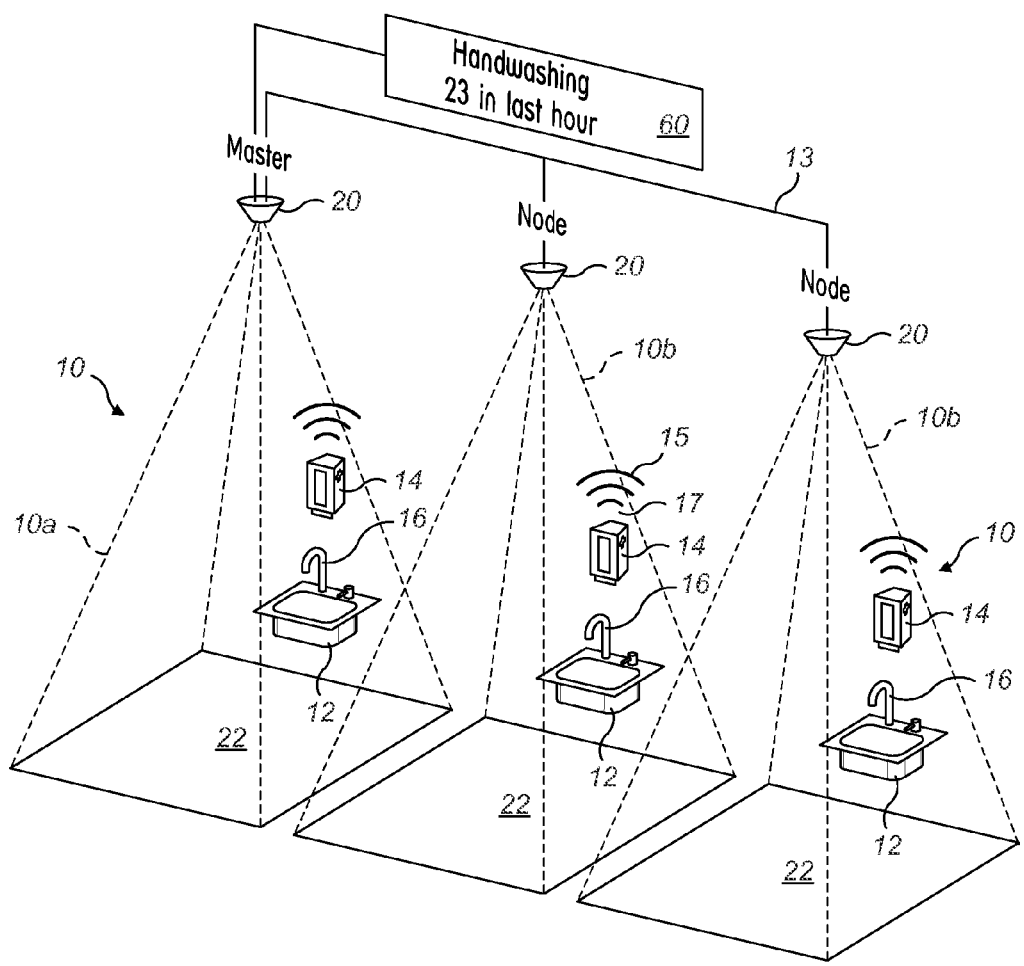
FIG. 5 is a schematic diagram of a first embodiment of a system suitable for implementing the method of the invention.
Figure 6:
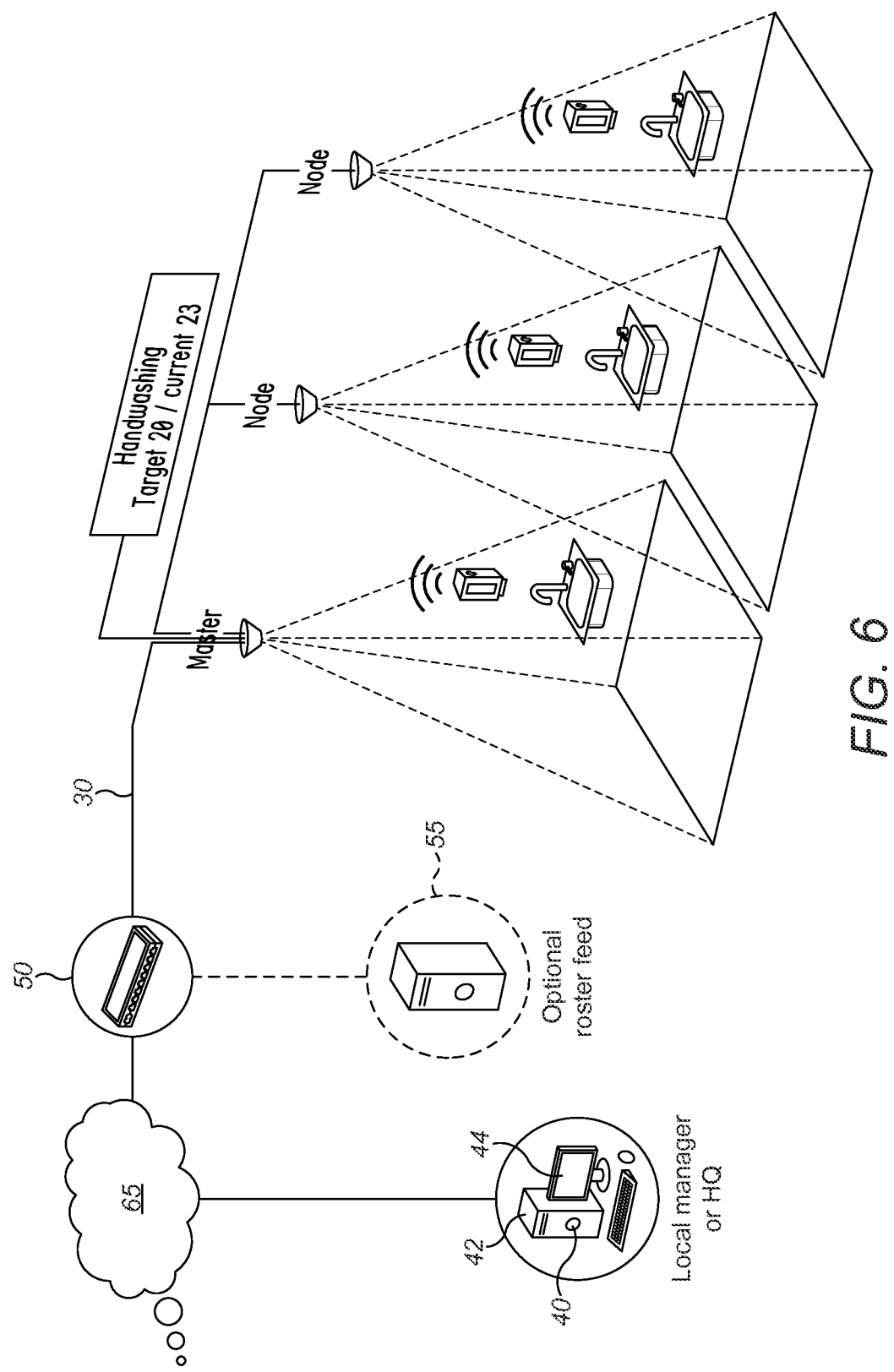
FIG. 6 is a schematic diagram of a second embodiment of a system suitable for implementing the method of the invention.

Referring now to FIGS. 5 and 6, first and second preferred embodiments of the illustrated system of the invention are shown comprising a plurality of hand wash or cleansing stations 10 comprising a master hand wash station 10a and a number of node stations 10b. While the plurality of hand wash stations 10 are shown positioned in side by side relationship, it will be understood that these may be located remotely from each other at different locations in an establishment such as a kitchen of a restaurant, a work area of a raw food production line, or a ward of a hospital or the like. Furthermore, they may be stand-alone stations and not comprise a master/node arrangement, although network connected groups of wash stations as shown in FIGS. 5 and 6 are preferred.

Each hand wash station 10 is depicted as having associated therewith a respective presence detector 20 for detecting the presence of a person at a hand wash station 10. While the presence detectors 20 could each be stand-alone devices associated with their respective wash stations 10, it will be understood that they may be interconnected by a local network 13 to enable them to interoperate as a detector system to not only merely detect the presence of a person at a wash station 10, but to identify and track motion of individuals through an area or areas comprising their respective image views 22 (illustrated by shaded areas of FIGS. 5 & 6). The local network 13 may comprise a Local Area Network (LAN) and may comprise a wired network, although, in some embodiments, it may comprise or include wireless network connections between the presence detector 20 of the master hand cleansing station 10a and the presence detectors 20 of the node hand cleansing stations 10b. In this connection, the term "identify" is taken to mean that the system cannot identify an individual by physical characteristics, but can identify an individual as being a specific one of a number of individuals being monitored, but whose identities are preserved from physical recognition.

Referring to FIG. 7, a presence detector unit 20 suitable for use in the embodiments of the invention comprises an infrared detector array 110 and an associated readout circuit 112 in a package 118, mounted on a circuit board 119 supporting a microprocessor 120 and other electronic components including a memory 124. An infrared transmitting lens 121 is mounted directly on the packaged array 118 to focus radiation from a scene or image view 22 onto the array 110. The foregoing components are protected by a housing 122. The housing has a window 123 that is transparent to infrared radiation. A presence detector unit 20 of the type shown in FIG. 7 is described in more detail in EP-A-0853237. In a typical installation the detector unit 20 is mounted on the ceiling of a building.

As shown in FIG. 7, each presence detector 20 is configured with a (micro)processor 120 and memory 124 such that each presence detector can be configured to operate in a stand-alone configuration/mode or a network connected configuration/mode. In a network connected mode, the presence detector 20 of the master hand cleansing station 10a is provided with a processor 120 and memory 124 of sufficient power and size to process signals and/or data from all of the node hand cleansing stations 10b.

Referring again to FIGS. 5 and 6, each presence detector 20 is depicted as monitoring a respective image view 22 or defined area of floor space 22 which is separate and distinct from the image views 22 of other presence detectors 20 and which is associated with a respective wash station 10, but it will be understood that the image views 22 may overlap. Furthermore, the presence detectors 20 may not comprise a one to one relationship with the plurality of wash stations 10, but may comprise a separate network of detectors 20 covering a floor space area of an establishment or a part of an establishment encompassing the locations of all of said plurality of wash stations 10 such that the resulting presence detector system is enabled to monitor a plurality of individuals, identify and track them in order to determine when any one of said individuals occupies a predefined space in the vicinity of a wash station 10 whereby it can be assumed that the individual is intending to use that wash station 10 or in the process of doing so. In some embodiments where a wash station 10 is a stand-alone system, the presence detector 20 may be limited to monitoring a small predefined space in the vicinity of its wash station 10 where said space is selected as comprising the space to be naturally occupied by a person when washing their hands at the wash station 10. The predefined space may be selected to have a size that is such that it can be occupied by no more than a single individual. This may comprise a space immediately to the front of a wash basin 12 or sink 12 of that wash station 10. More preferably, however, the image view 22 of the presence detector 20 is significantly larger than the space that can be occupied by at most one individual as the presence detector 20 or detector system is configured to determine the presence of an individual at a hand cleansing station 10 while discounting other individuals who may pass through the image view(s) 22 monitored by the presence detector(s) 20 for other legitimate purposes.

Each wash station 10 also comprises a cleansing product dispenser 14 such as a soap dispenser. Furthermore, associated with each wash sink 12 is a faucet 16 for delivering water for washing of hands.

The soap dispenser 14 may be of a type that is arranged to output a signal or data to the processor 120 of the presence detector 20 when it is actuated by a user to dispense some soap product. The soap dispenser 14 is preferably connected to said processor 120 by a wireless network link 15, but, in some embodiments, it may be connected to the presence detector processor 120 by a wired network link.

US2010/0332022A discloses a cleansing product dispenser such as a soap dispenser that is associated with a data collection unit that collects data relating to dispensing events, such as the dispensing of material from the dispenser. It will be apparent that a dispenser of this type is enabled to output a signal or data indicative of soap dispensing events and could readily provide the dispensation indication to the system of certain embodiments of the present invention.

For legacy installations where one or more of the soap dispensers 14 are not of a type configurable to output a signal or data indicative of actuation, the system of the invention includes providing independent means for detecting actuation of such soap dispensers 14. The independent actuation detection means may comprise a proximity sensor 17 detecting the presence of a hand above or below the dispenser 14, dependent on the type of soap dispenser 14. The proximity detector 17 may be any of a capacitive sensor, ultrasonic sensor, reflective IR sensor, or light beam sensor. The proximity sensor 17 is configured to communicate a signal or data to the processor 120 of its respective presence detector 20 when it detects an actuation event of its associated soap dispenser 14.

The presence detectors 20 of each wash station 10 or the system of presence detectors covering the area or areas 22 in which the wash stations 10 are located preferably comprise low resolution detectors such as pyroelectric detectors as hereinbefore described, although it will be understood that any detector capable of detecting the presence of a person within a predefined space adjacent to a wash basin and configured to output a signal or data to a processor indicating the presence of the person could be used in certain embodiments of the present invention. Furthermore, it will be understood that the presence detectors 20 or presence detector system are configured not only to output data to a processor indicating the presence of a person at a wash station 10, but to also output data indicative of the continuing presence of said person at the wash station 10. This may be achieved by the presence detector or presence detector system outputting data periodically indicating that the person is still at the wash station 10 or outputting data indicating when the person is detected as having left the vicinity of the wash station 10, it being assumed that their presence is continuous until they leave after they have initially been detected as arriving. The presence detector(s) 20 may be configured to output data to a processor of the soap dispenser, to the onboard processor 120 of a presence detector 20 or to a processor 40 of a networked computing device 42 (FIG. 6) such as a server, said networked computing device 42 being connected by a network 30 to the local network 13. The computing device 42 may comprise a local management device or system or a headquarters management device or system.

The network 30 may include a router 50 and an optional roster computing device 55 for providing roster information on a number of working employees when setting compliant hand wash event targets, etc. The network 30 may comprise any one or any combination of: an extension of the local network 13; a wide area network, a private network, and a public network such as the internet 65.

In the case where the presence detector system tracks individuals through a space encompassing the locations 22 of one or more of the wash stations 10, it will be understood that the processor 120 of the presence detector 20 of the master wash station 10a of the presence system and/or the networked computing device (server) 42 may be provided with data defining a floor plan of the monitored space, said floor plan including locations of wash stations 10 such that the presence system or server 42 can determine when an individual has entered a defined space in the vicinity of a wash station 10 where said defined space is designated as a hand washing space, e.g. the presence of a person in such a space is indicative that the person is intending or is in the process of washing their hands.

Each wash station may have associated therewith a respective display device, but preferably a single display device 60 is provided for a number of the wash stations 10 whereby the display device 60 is positioned such that observers can view data being displayed thereon relating to performance of the wash stations 10. This data may comprise or include a visual display of a running total of all washes and/or the subset of acceptable washes, e.g. compliant, hand washes by the staff of the establishment providing the wash stations 10.

A method according to the invention may comprise the presence detector 20 at a wash station 10, presence detector system or networked computing device 42 receiving an indication by any suitable means that a dispensation of soap has taken place at the soap dispenser 14 of that wash station 10. Algorithms executed by a processor 120 of a detector 20, the processor 120 of the master presence detector, or the processor 40 of the computing device 42 may measure the duration of the presence of the individual at the sink 12 following the indication that soap has been dispensed. The algorithms may be based on activity in a region of an infrared array sensor comprising the detector 20 or by tracking a target associated with the monitored individual and determining when the person is present in the required location following dispensation of the soap, e.g. predefined space in the vicinity of the wash station 10, and when the person moves away, which may be referred to as the "dwell time".

A comparison is then made of the dwell time to a predetermined first threshold period that may be compared with each such presence measurement to judge where a pass or fail condition occurs, e.g. a compliant or non-compliant wash event has occurred. It may further provide the actual duration of the wash or an indication of quality based on the duration by way of performance statistics which can be displayed and/or later analyzed for management or other purposes. The judgment against the threshold is preferably integrated within the detector 20, but could be performed in any suitable part of the system.

More explicitly, in a method of monitoring hand washing by individuals according to the invention, the processor 120 of a presence detector 20 of the master wash station 10*a* or a node wash station 10*b* receives from a soap dispenser 14 or a soap dispenser actuation detector 17 a signal or data indicative of actuation of the dispenser 14. The soap dispenser 14 or dispenser actuation detector 17 may be configured to provide only an indication of a first actuation of the dispenser 14 where a user makes many actuations within a short period of time. However, in some embodiments of the invention, the soap dispenser 14 or the dispenser actuation detector 17 provides signals or data indicative of all actuation events by users. Consequently, the system of the invention may be enhanced by configuring the processor 120 of the presence detector or the processor 40 of the server 42 to process said dispenser actuation signals or data as an indication that the soap dispenser 14 being actuated may be not functioning correctly or may need replenishing with soap. The processor may be configured to output an alert to indicate such a condition. However, the processor may be configured to not output an alert until there have been a predetermined number of occurrences of repeated actuation of the soap dispenser 14.

The method further comprises receiving at said processor 120 a signal or data indicative of the presence of an individual at said wash station 10 following actuation of the soap dispenser 14. This signal or data is preferably provided by the presence detector 20 or the presence detector system. The presence detector 20 determines the presence of an individual at a wash station 10 by detecting the presence of the individual within a predefined space in the vicinity of said wash station 10, said space being selected as the space an individual would occupy if washing their hands at a wash basin 12. It will be understood from the foregoing description that the processor 120 of the presence detector 20 is configured to execute an algorithm embodied by machine readable instructions stored in the memory 124 to discount individuals detected within the image area 22 of the presence detector 20 who are not also occupying the predefined space in the vicinity of said wash station 10, e.g. to ignore any individual who may enter the image area 22 of the presence detector 20 who may have a purpose other than visiting the wash basin 12. The presence detector 20 is configured to continue providing signals or data to the processor 120 for the duration that the individual remains at the wash basin 12 and may continue to do so after the individual is detected as moving away from the predefined space in the vicinity of said wash station 10. In this way, the processor 120 can determine the length of time the individual has been continuously present at the wash basin 12.

In some embodiments, the presence of an individual at the wash station 10 may be determined from the signal or data indicative that the soap dispenser has been actuated. The individual may be assumed to be continuously present at the wash station 10 until such time as the processor receives another later signal or data indicative of an activity which suggests the individual has completed the hand wash process. This later signal or data may be provided by the presence detector 20 detecting that the individual has moved away from predefined space in the vicinity of said wash station 10. Alternatively or additionally, this later signal or data may be provided by actuation of a hand towel dispenser or actuation of a hand dryer apparatus. In the event that the later signal or data is provided to the processor 120 by a suitably configured hand towel dispenser or hand dryer apparatus, the presence detector 20 may provide robustness to the system of the invention by confirming that a tracked individual has remained continuously at the wash basin 12 and that unconnected events by other individuals within the image area 22 of the presence detector 20 are not confused with the continuous presence of the tracked individual at the wash basin 12.

The system of the invention may also be enhanced further by configuring the processor 120 of the presence detector or the processor 40 of the server 42 to process said towel dispenser or hand dryer apparatus signals or data as an indication that the towel dispenser or hand dryer apparatus is, or is not, functioning correctly or may need replenishing. The processor may be configured to output an alert to indicate such a condition.

A further enhancement of the system of the invention would be to configure the processor 120 to identify suspiciously low rates of hand wash events at a particular hand wash station 10 thereby suggesting some problem at said hand wash station 10 such as a malfunctioning soap dispenser 14, a soap dispenser 14 requiring a refill, a wash basin 12 that is blocked, or a faucet 16 that is not providing water, etc.

The processor 120 is configured to generate hand wash event data indicative of a length of a continuous period of time spent by said individual at said hand wash station 10 which may include generating an indication of hand wash quality for said hand wash event. The indication of hand wash quality may comprise an indication that the continuous period of time spent by the individual at the wash basin has exceeded a predetermined first threshold of time and this may also be identified as a hand wash compliant event. However, the indication of quality may have a qualitative character in that a grade of quality is provided dependent on how much time the continuous presence of the individual exceeds the predetermined first threshold. Other thresholds in addition to the first threshold may be implemented to generate an indication of quality and/or a compliant hand wash event. One such threshold could be the detection by the presence detector 20 or the presence detector system of one or more required behaviors by an individual when present at the wash basin such as a detected degree of movement of the individual hands above the wash basin 12. Another such threshold or parameter could be detecting actuation by the individual of the towel dispenser or hand dryer apparatus. This would be particularly applicable to embodiments where the towel dispenser or hand dryer apparatus are within an individual's reach of the wash basin 12.

As shown in FIGS. 5 and 6, the method of the invention is preferably conducted in connection with a plurality of hand wash stations 10 whereby data for a plurality of hand wash events is collected and processed to provide an indication of hand wash quality for said plurality of hand wash events and/or an indication of a number of compliant hand wash events. The processor 120 may be configured to perform statistical analysis of the hand wash event data to determine at least one of: a mean hand wash time comprising a mean time spent by an individual at a hand cleansing station following actuation of a hand cleansing product dispenser; a distribution of hand wash times; and a distribution of mean hand wash times. An increase in hand wash quality indication may then be determined from any one or any combination of: an increase in a length of mean hand wash time; a narrowing of the distribution of hand wash time; and a narrowing of the distribution of mean hand wash times.

In some embodiments, hand wash event data is collected over a predetermined time period. The time period, as hereinbefore described, may be derived from a staff roster system or from a staff clocking in/out system such that collected data is associated with an identifiable group of staff. Therefore any statistics on, for example, quality of hand washing and/or numbers of hand wash events deemed compliant derived from said set of data will represent the hand washing performance of that identified group of staff.

In order to provide feedback to staff, metrics such as a running total of all hand wash events, an indication of hand wash quality, and/or a running total of compliant hand wash events may be displayed on the display 60. Where the collected hand wash event data relates to an identifiable group of individuals such as a shift of staff at a restaurant, for example, the system and method of the invention enable "team based reporting" where a group is encouraged to raise their standards and work better together rather than punitive reporting on individuals. The display of metrics as described above will help individuals in a staff group to self-police to some extent so that their colleagues can help them achieve the required standard through peer pressure. Furthermore, the feedback indicator at each wash basin 12 will help them to remember to do what is required. The system and method of the invention may also raise the potential for competition between staff groups in chained restaurants, etc.

The method also preferably includes the step of providing an audible and/or visual countdown indication to an individual at a hand wash station 10 until their hand wash achieves compliant status or an audible and/or visual indication that their hand wash is considered to be a compliant hand wash event.

In other embodiments, a number of different sensors may be considered for detection of the presence of the person at the required location which have inherent weaknesses but could be acceptable embodiments of the invention. These include, for example:

- RFID tags—this involves compliant employees and good management which have been found to be problematic. Further, location estimation of an RFID tag worn on a person can give significant errors and is less reliable in the real world for the required accuracy.
- Near field infrared (PIR) detectors—these typically have a single indication of presence and often only detect significant movement. They are typically long range and for large areas and less reliable for determining continued presence of one person while others may be moving nearby.
- Ultrasonic proximity sensor—these are typically used in applications such as automatic taps or towel dispensers or for parking sensors in automotive applications. Controlling range of detection can be problematic where an object such as a person is a complex shape or may not stand in a repeatable location. Further, such a sensor would also respond to other objects for example a trolley or stack of boxes stored in the same location.
- A cooperative combination of one or more of the same or different types of sensor including RFID, PIR and ultrasonic sensors may be envisaged to address some shortcomings identified with individual sensor technologies but with increased cost and installation complexity.
- Video camera with image processing—Video cameras and the processing required are relatively expensive and considered intrusive and therefore not liked.
- High resolution thermal imager with image processing—as video but more expensive.

The apparatus described above may be implemented at least in part in software. Those skilled in the art will appreciate that the apparatus described above may be implemented at least in part using general purpose computer equipment or using bespoke equipment.

The hardware elements, operating systems and programming languages of such computers are conventional in nature, and it is presumed that those skilled in the art are adequately familiar therewith. Of course, any server functions may be implemented in a distributed fashion on a number of similar platforms, to distribute the processing load.

Here, aspects of the methods and apparatuses described herein can be executed on a mobile station and on a computing device such as a server. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

What is claimed is:

1. A method of monitoring hand washing by individuals, comprising the steps of:
   receiving at a processor a signal indicative of actuation of a cleansing product dispenser at a hand cleansing station;
   receiving at said processor a signal indicative of the presence of an individual at said cleansing station, wherein the signal indicative of the presence of the individual is generated by a detector having a sensor comprising an array of thermal detector elements, the detector configured to monitor a defined area of floor space in a vicinity of said hand cleansing station, and wherein the signal indicative of the presence of the individual is received after actuation of the cleansing product dispenser when the individual is at the defined area of floor space in the vicinity of said hand cleansing station;
   processing said signal to generate hand wash event data indicative of a length of a continuous period of time spent by said individual at said hand cleansing station; and
   determining a hand wash quality by comparing the length of the continuous period of time spent by said individual at said hand cleansing station to a predetermined threshold of time.

2. The method of claim 1, further comprising collating hand wash event data for a plurality of hand wash events and processing said data to provide:
   an indication of hand wash quality for said plurality of hand wash events; and
   an indication of a number of compliant hand wash events for said plurality of hand wash events, a compliant hand wash event being determined by reference to the predetermined threshold of time.

3. The method of claim 1, wherein hand wash event data is collated for a plurality of hand wash events at a plurality of hand cleansing stations over a predetermined time period comprising any of: a set time period; an arbitrary time period inputted to the processor; or a time period determined from staff presence data.

4. The method of claim 1, wherein an increase in hand wash quality indication is determined from any one or any combination of: an increase in a length of mean hand wash time; a narrowing of a distribution of hand wash time; and a narrowing of a distribution of mean hand wash times.

5. The method of claim 1, further comprising the step of displaying on a display any one or any combination of: a running total of all hand wash events; an indication of hand wash quality; a running total of compliant hand wash events.

6. The method of claim 1, further comprising the step of providing an audible and/or visual countdown indication to an individual at a hand cleansing station until their hand wash achieves compliant status or an audible and/or visual indication that their hand wash is considered to be a compliant hand wash event.

7. A detector for monitoring hand washing by individuals at a hand cleansing station, the detector comprising:
   a processor for receiving a signal indicative of actuation of a cleansing product dispenser; and
   one or more sensors having an array of thermal detector elements configured to i) monitor a defined area of floor space in a vicinity of said hand cleansing station, ii) determine the presence of an individual at said hand cleansing station and iii) output a signal indicative of the presence of the individual at said hand cleansing station,
   the processor adapted to process said signals to generate hand wash event data indicative of a length of a continuous period of time spent by said individual at said hand cleansing station after actuation of the cleansing product dispenser when the individual is at the defined area of floor space in the vicinity of said hand cleansing station, and determine a hand wash quality by comparing the length of the continuous period of time spent by said individual at said hand cleansing station to a predetermined threshold of time.

8. The detector of claim 7, wherein the processor is configured to collate hand wash event data for a plurality of hand wash events and process said data to provide;
   an indication of hand wash quality for said plurality of hand wash events; and/or
   an indication of a number of compliant hand wash events for said plurality of hand wash events, a compliant hand wash event being determined by reference to the predetermined threshold of time.

9. The detector of claim 7, wherein the processor is configured to collate hand wash event data for a plurality of hand wash events at a plurality of hand cleansing stations over a predetermined time period comprising any of: a set time period; an arbitrary time period inputted to the processor; or a time period determined from staff presence data.

10. The detector of any one of claim 7, wherein the processor is configured to determine an increase in hand wash quality indication from any one or any combination of: an increase in a length of mean hand wash time; a narrowing of a distribution of hand wash time; and a narrowing of a distribution of mean hand wash times.

11. The detector of any one of claim 7, wherein the processor is configured to display on a display any one or any combination of: a running total of all hand wash events; an indication of hand wash quality; a running total of compliant hand wash events.

12. The detector of any one of claim 7, wherein the processor is configured to provide an audible and/or visual countdown indication to an individual at a hand cleansing station until their hand wash achieves compliant status or an audible and/or visual indication that their hand wash is considered to be a compliant hand wash event.

13. A hand cleansing station for monitoring hand washing by individuals, the hand cleansing station having a detector according to claim 7.

14. A system for monitoring hand washing by individuals, said system comprising:
 one or more hand cleansing stations, wherein the one or more hand cleansing stations each include a detector for monitoring hand washing by individuals at the one or more hand cleansing stations, each detector comprising:
  a processor for receiving a signal indicative of actuation of a cleansing product dispenser; and
  one or more sensors having an array of thermal detector elements configured to i) monitor a defined area of floor space in a vicinity of said hand cleansing station, ii) determine the presence of an individual at said hand cleansing station and iii) output a signal indicative of the presence of the individual at said hand cleansing station, the processor adapted to process said signals to generate hand wash event data indicative of a length of a continuous period of time spent by said individual at said hand cleansing station after actuation of the cleansing product dispenser when the individual is at the defined area of floor space in the vicinity of said hand cleansing station;
 a central station comprising a main processor and a memory;
 a network communicatively connecting each of said one or more hand cleansing stations to the central station, said central station being adapted to receive data from the one or more hand cleansing stations.

15. The method of claim 1, wherein the defined area of floor space in the vicinity of said hand cleansing station is selected as comprising space to be naturally occupied by said individual when washing hands at said hand cleansing station.

16. The detector of claim 7, wherein the defined area of floor space in the vicinity of said hand cleansing station comprises space to be naturally occupied by said individual when washing hands at said hand cleansing station.

17. The system of claim 14, wherein the central station determines a hand wash quality by comparing the length of the continuous period of time spent by said individual at said hand cleansing station to a predetermined threshold of time.

* * * * *